Patented Oct. 17, 1922.

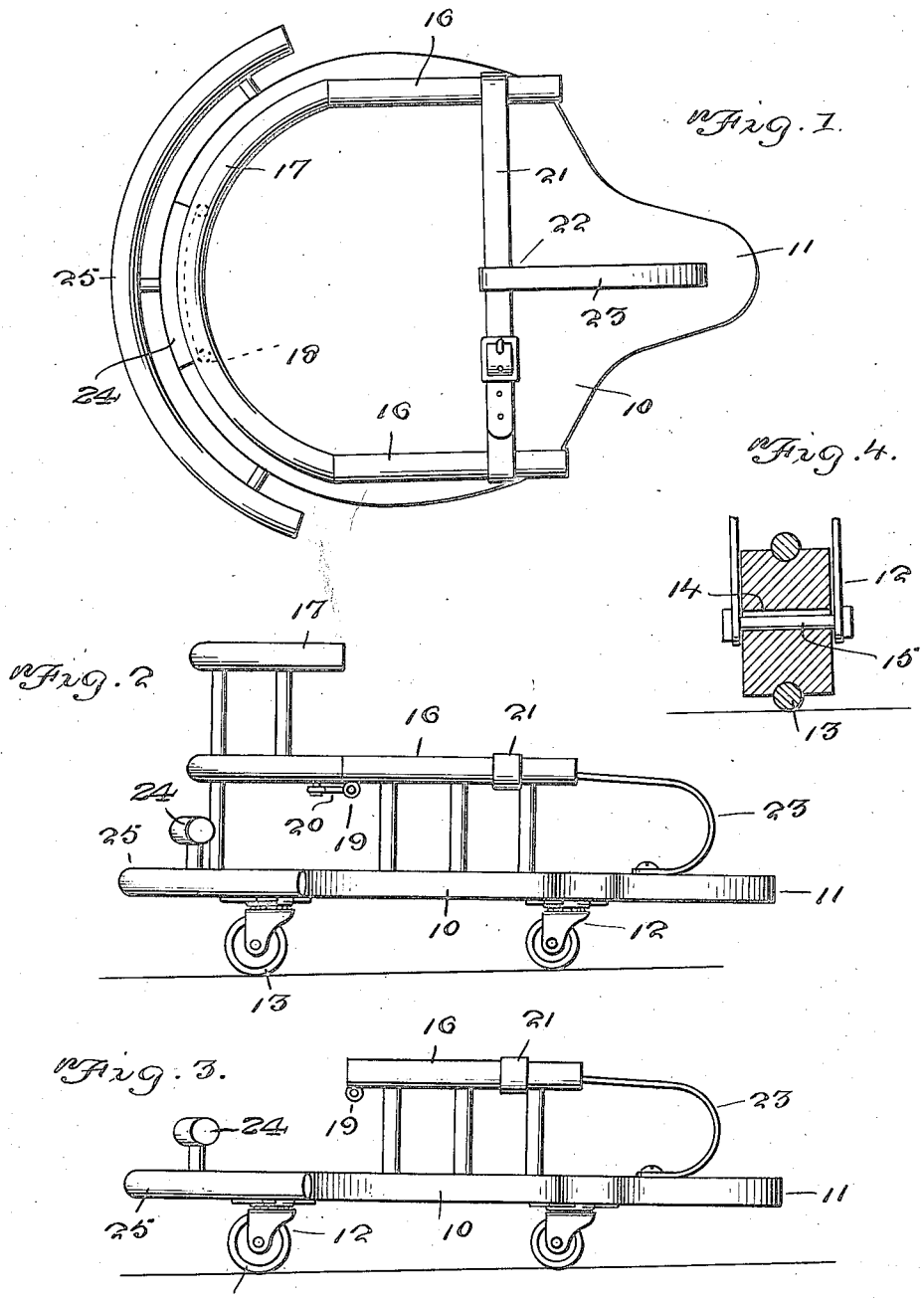

1,432,612

UNITED STATES PATENT OFFICE.

JOSEPH N. O'CONNOR, OF SEATTLE, WASHINGTON.

SANITARY CREEPER CAR.

Application filed March 25, 1922. Serial No. 546,628.

*To all whom it may concern:*

Be it known that I, JOSEPH N. O'CONNOR, a citizen of the United States, residing at Seattle, in the county of King and State of Washington, have invented new and useful Improvements in Sanitary Creeper Cars, of which the following is a specification.

This invention contemplates the provision of what I term a sanitary creeper car for young infants and is designed to allow the infant to occupy the creeper in either a sitting or lying position, face downward, and subsequently move himself about with ease and comfort.

More specifically stated, the invention embodies a base or platform mounted on casters or wheels, and supporting a back rest and combined arm rests and hand holds, the back rest being detachably associated with the platform so that it can be conveniently removed therefrom to allow the infant to lie upon the platform face downward, the platform further supporting a hand hold and guard which are conveniently arranged adjacent the platform, the hand hold being used subsequent to the removal of the back rest from the platform, while the guard is disposed to prevent the infant from injuring his hands by bringing them in contact with the adjacent wheels or casters.

Another important object of the invention resides in the fact that the platform or base is arranged at an angle or inclination to the ground or surface for sanitary purposes, inasmuch as the water or the like will readily run off the platform or base.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a top plan view of the device forming the subject matter of the present invention.

Figure 2 is a side elevation thereof.

Figure 3 is a view similar to Figure 2 showing the back rest removed.

Figure 4 is a sectional view through one of the rollers or casters.

Referring to the drawing in detail, 10 indicates the platform which is provided with a reduced extension 11 at the forward extremity thereof for the convenience of the occupant, it being understood that when the infant sits upon the platform his legs are arranged at the opposite sides of the extension 11. The platform is supported by ball bearing casters or the like indicated at 12, and each of these is preferably provided with a rubber tire 13. Each caster wheel 13 is provided with a bore 14 of greater diameter than the axle 15, so that the creeper can be very easily moved about the infant.

Supported upon the platform at the opposed sides thereof, are combined arm rests and hand holds indicated at 16, while supported by the platform at the rear of these parts, is a back rest indicated at 17. The platform is provided with openings 18 which receive the adjacent portions of the back rest 17, in a manner which permits of the back rest being separated from the platform for the purpose to be hereinafter described. The back rest when supported upon the platform is held effectively in position, through the instrumentality of means which connect the back rest with the combined arm rests and hand holds indicated at 16. Any suitable means may be provided for this purpose, but I preferably employ arm rests with eyes or loops 19 which are disposed to receive the pivoted hook-like elements 20 associated with the back rest 17 as shown. The back rest is curved and of a size so that the terminals of the back rest are arranged in end to end relation with the arm rests 16, thus forming with the latter a good and substantial support for the infant to prevent him from falling off the platform in any direction.

The arm rests 16 are connected by a strap 21 which is also used to prevent the infant from falling from the creeper forwardly, and the strap 21 passes through a loop 22 provided by the terminal of a strap 23, which has its other terminal suitably secured to the extension 11. When the occupant or infant uses the creeper, his legs are disposed or arranged at the opposite sides of the strap 23, and the construction and arrangement of the straps are such as to prevent him from falling off the platform. The infant can sit upon the platform and move about in a very convenient manner, or he can lie upon the platform face downward, and to permit of the use of the device in this manner, the back rest is detachably associated with the platform as above stated. Therefore it is only necessary to remove the back rest from the platform, by releasing the hook-like elements 19 and then lifting the back rest 17 out of the openings 18. When the infant lies upon the platform in the manner stated, he can take hold of the hand holds 24 supported adjacent the rear of the platform and centrally thereof. In addition to this, a guard rail 25 is supported by the edge of the platform about the rear thereof, and is slightly spaced from the platform to prevent the infant from placing his hands too close to the adjacent wheels or casters with resultant injury. This guard rail can also be used as a convenient hand hold.

The base or platform 10 is supported at an angle or inclination to the ground or surface, for sanitary purposes. While the platform may be supported in any suitable manner at an inclination to the surface, this is preferably accomplished by having the front wheels or casters considerably smaller than the rear wheels or casters as illustrated in the drawing.

It is obvious that by having the platform or base inclined in the manner stated, that urine will quickly pass off the platform so that the creeper can be kept in a more sanitary condition.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A device of the class described, comprising a platform, casters supporting said platform, combined arm rests and hand-holds supported by the platform adjacent the sides thereof, a strap terminally secured to said arm rests, an additional strap having one end secured to the platform and its opposite end terminating to provide a loop to receive the first mentioned strap, a back rest supported by the platform and capable of being separated therefrom, means detachably connecting the back rest with the arm rests, an additional arm rest supported by the platform at the rear of the back rest, and at a point approximately on the longitudinal center of the platform, and a rail supported by the edge of the platform about the rear thereof and spaced therefrom for the purpose specified.

2. A device of the class described comprising a platform, wheels supporting the platform and swivelled thereon, the wheels at the forward end of the platform being smaller than the wheels at the rear thereof, so as to support the platform at an angle or inclination to the ground or surface, arm rests supported by the platform at both sides thereof, a back rest supported by the platform and capable of being separated therefrom, means for detachably connecting the back rest with the arm rest, straps secured to the arm rests and platform for the purpose specified, a hand hold supported by the platform adjacent the rear thereof, and a rail supported by the rear edge of the platform and spaced therefrom.

3. A baby creeper comprising a wheeled platform formed to provide a reduced portion at the forward end thereof, arm rests supported by the platform at the sides thereof, a curved back rest having its ends arranged in end to end relation with the arm rests and adapted to be used when the infant occupies the creeper in a sitting position, straps terminally connected with the arm rests, an additional strap having one end secured to the reduced portion of the platform and its other end associated with the first mentioned strap, said back rest being capable of being separated from the platform to allow the infant to lie upon the platform between the arm rests, means for detachably connecting the back rest with the arm rests, and a hand hold supported by the platform adjacent the rear thereof and adapted for use when the infant occupies the creeper in a lying position.

4. A baby creeper comprising a wheeled platform, arm rests arranged at the sides thereof, a curved back rest terminating in end to end relation with the arm rests and detachably associated with the platform, said back rest being used when the child occupies the creeper in a sitting position, means detachably connecting the back rest with the arm rests, said back rest being separated from the platform and said arm rests to permit the child to occupy the creeper in a lying position, a hand hold supported by the platform at the rear thereof and adapted for use when the back rest is removed, and a guard rail supported by and spaced from the rear edge of the platform and curved to conform to said platform.

In testimony whereof I affix my signature.

JOSEPH N. O'CONNOR.